(12) United States Patent
Sattler et al.

(10) Patent No.: US 7,774,698 B2
(45) Date of Patent: Aug. 10, 2010

(54) SYSTEM AND METHOD FOR GENERATING A FRAMELESS WEB DISPLAY

(75) Inventors: Wolfgang Sattler, Kirkel (DE); Joachim Hartmann, St. Ingbert (DE); Lenin Kumar Subramaniam, Palo Alto, CA (US)

(73) Assignee: SAP AG, Walldorf (DE)

( * ) Notice: Subject to any disclaimer, the term of this patent is extended or adjusted under 35 U.S.C. 154(b) by 1048 days.

(21) Appl. No.: 11/165,910

(22) Filed: Jun. 24, 2005

(65) Prior Publication Data

US 2006/0294240 A1 Dec. 28, 2006

(51) Int. Cl.
*G06F 17/00* (2006.01)

(52) U.S. Cl. ............... 715/234; 715/236; 715/243; 715/272

(58) Field of Classification Search ........... 715/234, 715/236, 239, 243, 272
See application file for complete search history.

(56) References Cited

U.S. PATENT DOCUMENTS

| 5,913,029 A * | 6/1999 | Shostak ............... 709/203 |
| 7,103,836 B1 * | 9/2006 | Nakamura et al. ........ 715/207 |
| 2003/0014442 A1 * | 1/2003 | Shiigi et al. ............ 707/513 |
| 2004/0010682 A1 * | 1/2004 | Foster et al. ........... 713/156 |
| 2004/0098663 A1 * | 5/2004 | Rey et al. ............. 715/500 |
| 2004/0193699 A1 * | 9/2004 | Heymann et al. ......... 709/218 |

* cited by examiner

*Primary Examiner*—Thu Huynh
(74) *Attorney, Agent, or Firm*—Kenyon & Kenyon LLP

(57) ABSTRACT

In a system and method for generating a frameless display, a processor may select one of a plurality of page configurations based on session data in response to a page request, and may display, in accordance with the selected page configuration, a unitary page including data of a plurality of applications, such that the data of each of the applications is displayed in a corresponding one of a plurality of data regions defined by the selected page configuration.

15 Claims, 6 Drawing Sheets

SYSTEM AND METHOD FOR GENERATING A FRAMELESS WEB DISPLAY

BACKGROUND

Web browsers receive requests for web pages. For example, a user enters a URL or clicks in one web page a URL link to another web page. In response to such requests, the web browsers fetch the requested web pages from sources identified in the URLs and display the web pages in an interface of a user terminal. For most displayed web pages, web browsers provide mechanisms by which a user inputs various commands for controlling the web page display. Such commands include scrolling commands, a print command, and commands for navigation between previously displayed web pages. For example, a back button and a forward button are provided.

A single requested web page can include data from a number of sources, e.g., where a user interacts with a number of backend applications via a single web page. Conventionally, when a web browser returns to the user such a web page, the web browser divides the web page into a number of frames, as illustrated in FIG. 1. Each frame includes the data from a corresponding backend application. The web browser establishes a separate communications session for each frame, so that the user interacts with each frame independently of the other frames, as illustrated in FIG. 2. For example, the web browser provides a separate scroll bar for each frame. Accordingly, instead of, or in addition to scrolling the entire web page at once, the user separately scrolls each individual frame of the web page. Furthermore, in response to interactions between the user and a backend application via a frame of the web page, content of the frame is changed, without change to the rest of the web page.

Since such web pages include numerous scroll bars, view of much of the data presented in these web pages is obscured. Furthermore, since the frames of the web pages are each separately controlled, browser-based control commands, such as the print command and the page navigation commands, are disabled for such web pages.

Accordingly, there is a need in the art for a system and method for providing a web page that includes data for interaction with a plurality of backend applications, while providing functionality of browser-based commands, such as the print command and page navigation commands, and increasing visibility of the data of the backend applications.

DETAILED DESCRIPTION

Figure 1:
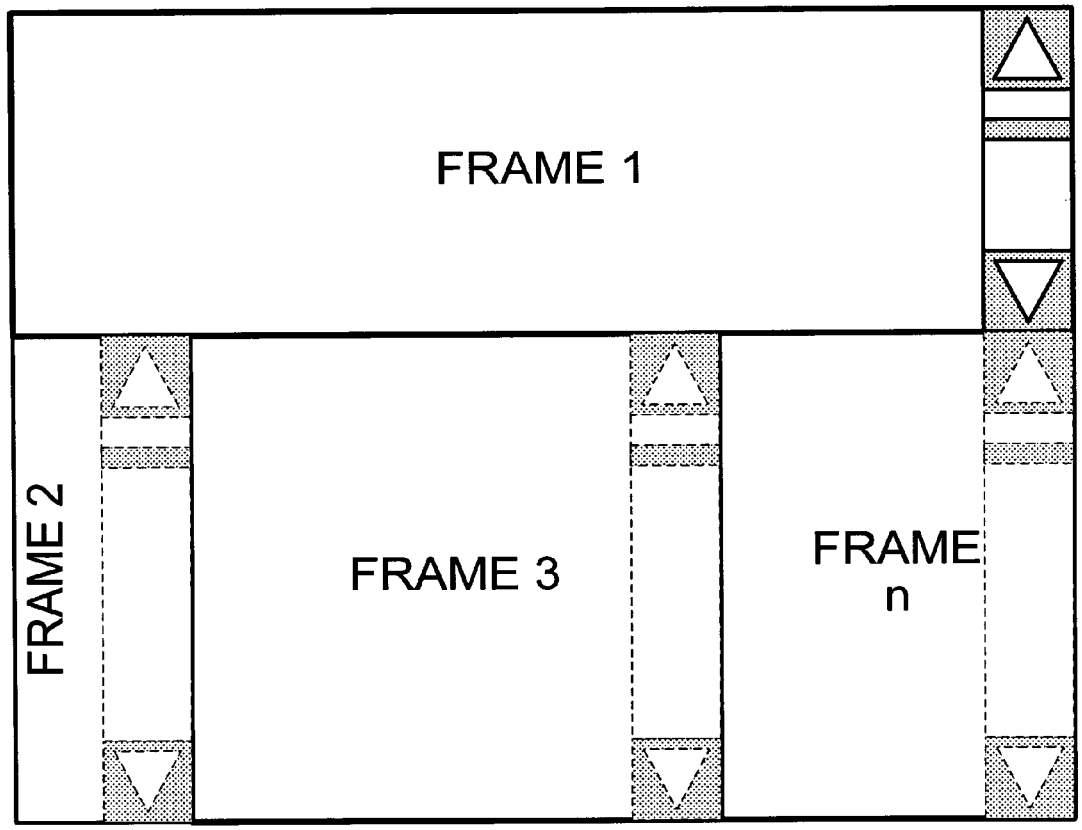
FIG. 1 illustrates an example of a prior art web page that includes frames for interaction with a plurality of backend applications.
Figure 2:
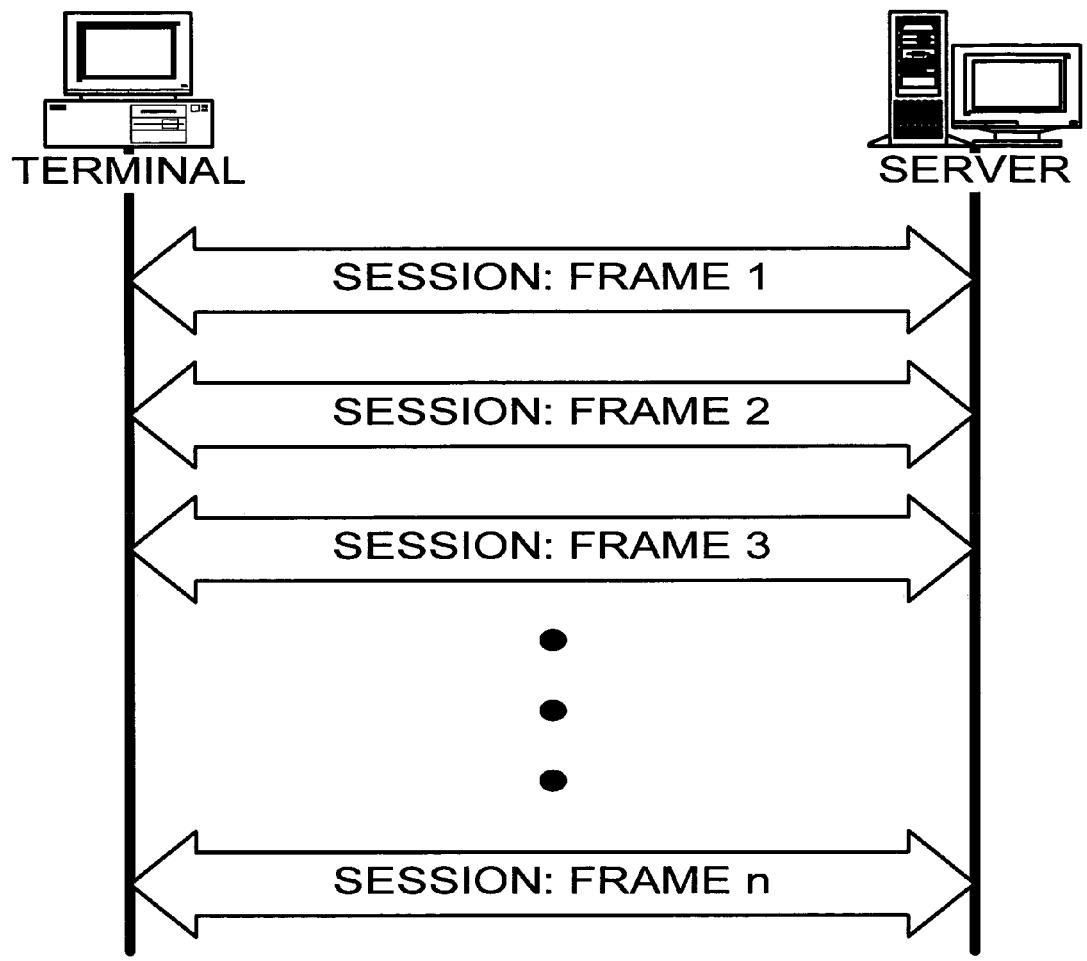
FIG. 2 illustrates a plurality of sessions between a user and a plurality of backend applications via a prior art web page.
Figure 3:
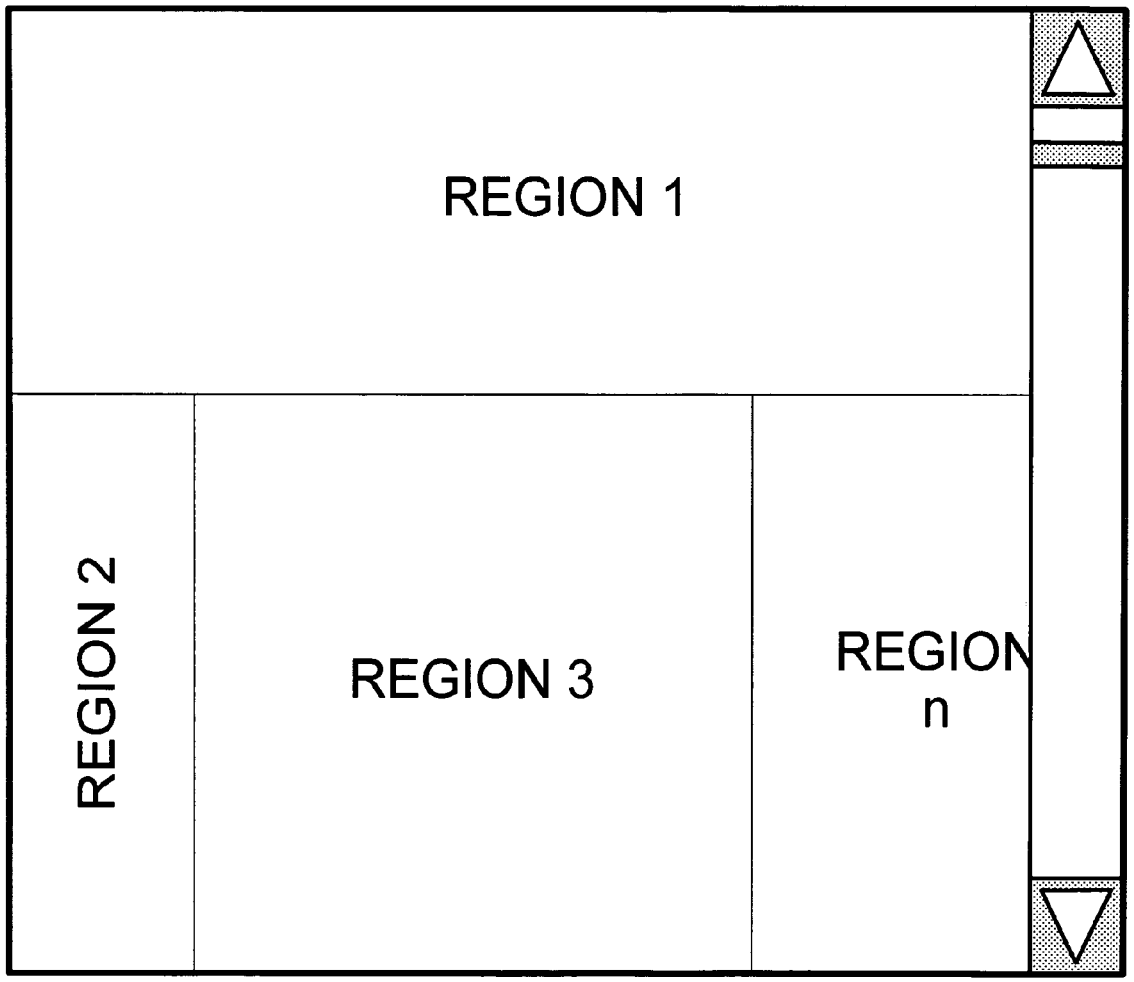
FIG. 3 illustrates an example of a frameless web page, according to an example embodiment of the present invention.
Figure 4:
FIG. 4 illustrates an establishment of a single session between a user and a plurality of backend applications, according to an example embodiment of the present invention.

Embodiments of the present invention relate to a computer system and method that may generate a frameless display for a web page via which a user may interact with a plurality of backend applications. In response to a web page request, a processor may choose from a plurality of predefined possible display configurations for the requested web page. Each predefined display configuration may define a layout of a plurality of regions corresponding to the plurality of backend applications. FIG. 3 illustrates an example frameless web page that includes such a plurality of regions. The processor may establish a single session for interaction by a user with all of the backend applications via the regions of the web page, as illustrated in FIG. 4. FIG. 4 illustrates a computer terminal and a server which are known to have computer-readable media such as hard discs, floppy disc and other computer-readable data storage media. Accordingly, an interaction with any one application may cause an update of the display of the content of all of the applications of the web page.

Figure 5:
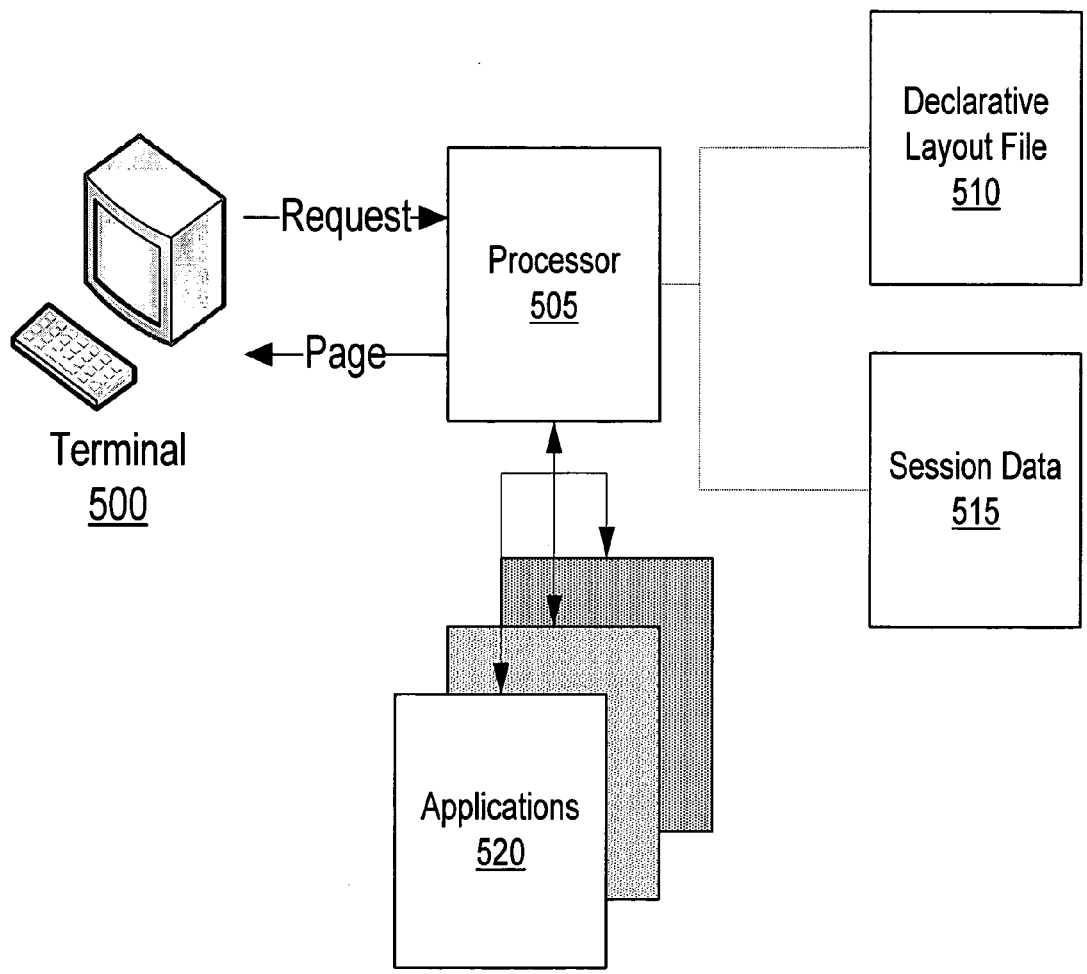
FIG. 5 is a block diagram that illustrates components of an example system, according to an example embodiment of the present invention.

FIG. 5 is a block diagram that illustrates components of a system according to an embodiment of the present invention. A declarative layout file 510 may include numerous page layout definitions. Each page layout definition may be without a fixed association with any particular web page, so that each page layout definition may be recycled for use in displaying numerous web pages. Additionally, for each requested web page, multiple page layout definitions may be alternatively used. In one embodiment, the declarative layout file 510 may be coded in the Extensible Markup Language (XML). In a computer system having client terminals and servers, data files are known to be stored on computer readable media such as hard discs that are accessible by the client terminals and servers.

In an embodiment of the present invention, in response to a request for a web page, e.g., where a user at a terminal 500 enters a Uniform Resource Locator (URL) of the web page, a processor 505, e.g., of a web server, may determine which page layout definition is to be implemented for display of the requested page, may select the page layout definition, and may return to the terminal the requested page for display according to the selected page layout definition. Accordingly, depending on the processor's selection, a particular requested page may be alternatively displayed according to various layouts.

Data of a plurality of applications 520 may be displayed within the returned page. The user may interact with the data, for example during a session established by one or more applications 520. For example, the applications 520 may include a shopping application in which product data is displayed, a basket application to keep track of the items selected by the user for purchase, and/or an application for generation of reports, for example, regarding user satisfaction of products. In one embodiment, a session may be initiated in response to an initial page request. A session data 515 that indicates the user's session progress with respect to all of the applications 520 may be stored. For example, session progress may include, but is not limited to, identification of the particular applications 520 with which the user has interacted during the session and the nature of the interactions. For example, the session data 515 may include data regarding the products added or removed from the basket.

Each page layout definition may define an arrangement of a plurality of data regions. Each data region may correspond to a particular one of the plurality of applications 520, of which data is displayed in the returned page. The page layout definition may provide for the arrangement within a single frame of all of the data regions that are to be displayed.

The declarative layout file 510 may also include data region and component definitions. The page layout definitions may refer to the data region definitions. For example, a "basket" layout definition may define an arrangement of a plurality of data regions of which one is a "minibasket" data region. Each of the data region definitions may in turn refer to a layout component to be implemented by default for the data region.

In one example embodiment of the present invention, the declarative layout file 510 may include a first section that includes a plurality of layout definitions; for each layout definition, its respective data region definitions; and, for each of the data region definitions, a default component to be implemented. The declarative layout file 510 may include a second section that includes a plurality of component definitions. For example, the first section of the declarative layout file 510 may include for the "minibasket" data region referred to above a reference to a "minibasket" default component. If the processor 505 determines to return a page arranged according to the "basket" layout, the reference of the "basket" layout definition of the first section to the "minibasket" component, may direct the processor 505 to the "minibasket" component definition of the second section. Accordingly, the processor 505 may return the page in accordance with the "minibasket" component definition.

In an example embodiment of the present invention, each data region may refer, in the alternative, to one of two types of components. A first type of layout component may directly define the particular content to be displayed. For example, it may provide a source from which data is to be retrieved for display within the corresponding data region, e.g., for data of a particular application 520 that corresponds to the data region, the layout component may provide the particular application 520 as the source.

A second type of layout component may be an instruction to the processor 505 to perform an action. An action may be a program function call. Different layout component definitions may define different types of actions. For example, the component definition may define an action to be performed by the processor 505 in which the processor 505 is to retrieve content from one of alternative sources depending on the user's session progress. When the processor 505 encounters such a component definition, the processor 505 may check the session data 515 to determine the user's session progress, and may accordingly retrieve data from one of the alternative sources indicated by the layout component definition. A component definition may accordingly indirectly provide the source from which to retrieve the data to be displayed within a corresponding data region.

A component definition may also define an action which references one or more layout definitions, data region definitions, and/or component definitions. For example, a particular component definition may define an action in which, if a first condition is satisfied, then the processor 505 is to retrieve data from a particular source for display in the data region for which the component definition is implemented, e.g., the data region allotted by the page layout definition for the application 520 with which the retrieved data is associated. The action of the particular component definition may also provide that if a second condition is satisfied, then a different page layout definition than the one for which the particular component definition is invoked is to be implemented. Similarly, the action may provide that the same layout definition is to be implemented, with the same data regions, but with a different component.

In an embodiment of the present invention, an action of a component definition may provide that upon satisfaction of a particular condition, the processor 505 is to re-display the page according to the layout definition according to which the processor 505 displayed the currently displayed page. Information regarding the display of a currently displayed page may be stored as session data 515. Accordingly, when executing this action, the processor 505 may refer to the session data 515 to determine the way in which to display the page. It will be appreciated, that aside from actions referenced by component definitions, the processor 505 may execute other actions irrespective of the particular layout, data region, or components definitions being implemented, e.g., in response to a user input or some other event.

Figure 6:
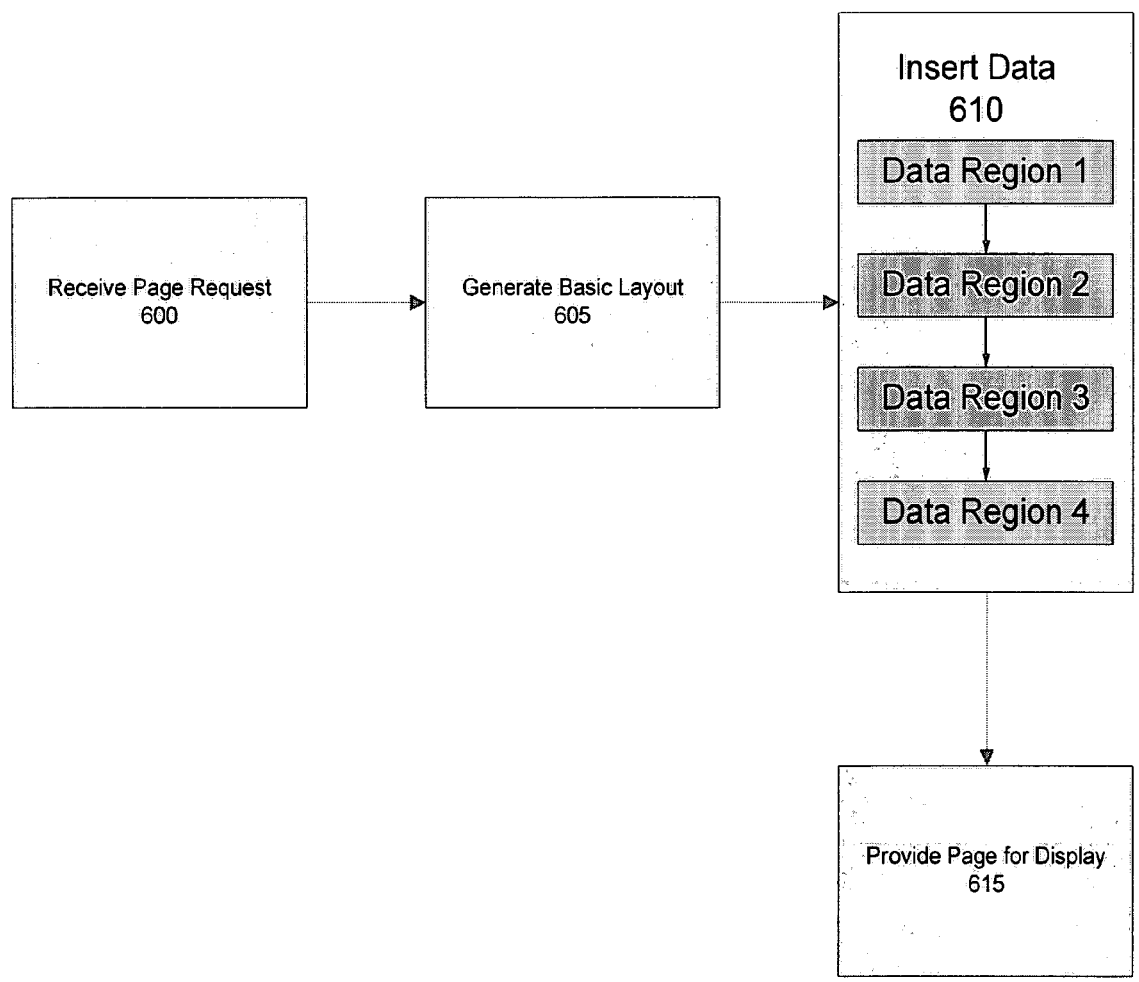
FIG. 6 is a diagram that illustrates a procedure for providing a page for display, according to an embodiment of the present invention.

FIG. 6 is a diagram that illustrates a procedure in which the processor 505 may provide a page to a user at the terminal 500. In 600, the processor 505 may receive a request for a page. In response to the request, the processor 505 may, in 605, refer to a layout definition in the declarative layout file 510 to generate a basic layout for the requested page. In 610, the processor 505 may insert component indicated data into defined data regions. The particular layout, data regions, and component indicated data to be used may be determined in accordance with the components definitions with reference to the session data 515. In 615, the processor 505 may provide the page to the user at the terminal 500 for display.

In an embodiment of the present invention, for each page that may be requested, the processor 505 may be configured to select a particular default page layout definition in response to an initial page request, e.g., when a session is first opened. In response to an interaction by the user with data displayed in the page returned in response to the initial request, the processor 505 may update the session data 515. The interaction may be treated as a new request for a page. In response to the new request, the processor 505 may initially select a default page layout definition for display of a page in response to the request. During configuration of the page, the processor 505 may be directed by actions of component definitions to use a different layout definition based on satisfaction of particular conditions as determined with reference to the session data 515. Accordingly, with each interaction of the user with applications 520 via a displayed page, e.g., by selection of hyperlinks in the displayed page, the processor 505 may provide a new display of a page for which the processor 505 determines the display configuration of all of the data regions of the page.

In an embodiment of the present invention, in response to interactions by the user with the page, the processor 505 may retrieve requested data from a backend application 520 for display in a corresponding data region of a page displayed by the processor 505 in accordance with the declarative layout file 510 as discussed above. The particular data to be retrieved may be determined by the processor 505 based on component definitions in conjunction with the session data 515. The particular data to be retrieved may be further determined based on parameters passed to the processor 505 by the user. For example, the user may conduct a search for particular products, and may accordingly enter search words as parameters.

In an example embodiment of the present invention, the user may select browser-based navigation commands to request a previously displayed page. For example, the user may select a back or forward button. According to this embodiment, context values may be saved when a page is displayed. For example, in response to a first page request, the processor 505 may determine to return to the terminal 500 a page displayed according to a particular page layout definition having particular data regions, and according to particular component definitions that instruct the processor 505 to perform alternative actions depending on the session data 515. Subsequent to the generation and display of the page, the session data 515 may be updated, e.g., in response to a second page request, such that re-generation of the requested page according to a page request identical to the first page request would result in a page having a different layout than the page displayed in response to the first page request. For example, generating a page according to a stored page layout definition may result in the generation of a page having a different layout than that of a page previously provided, since a current context may cause the processor 505 to execute actions referenced by the stored page layout in a manner different than a manner in which the actions were previously executed. Therefore, for each displayed page, context values, representing a state of the session data 515 at the time of the display of the page, may be saved before updating the session data 515 and responding to a new page request. When the user selects the browser-based navigation command, the processor 505 may generate for display a page according to a previously used page layout definition, data regions, and component definitions according to the saved context values. In an example embodiment of the present invention, the processor 505 may store in cache a URL of a currently displayed page. The processor 505 may embed in the URL context values representing the session context according to which the currently displayed page was generated. Alternatively, the processor 505 may store the context values in a separate memory area. In one embodiment, where URLs are limited to a predetermined size, the processor 505 may embed context values in the URL upon a condition that the predetermined URL size is not exceeded. Accordingly, the processor 505 may embed some context values in the URL, e.g., a number of context values that does not cause the predetermined URL size to be exceeded, and may store additional context values at a separate memory location. The processor 505 may embed in the URL pointers to the separate memory location at which the additional context values are stored.

In an example embodiment of the present invention, a page may include stateful objects and stateless objects. Stateful objects are those objects determined to be displayed according to the current state of the session data 515, regardless of selection of browser-based navigation commands. Stateless objects are those objects not determined to be displayed in this manner. For example, a user may expect that once an object is added to a basket, then it remains in the basket even in the event that the back button is selected. The processor 505 may be configured to omit saving context values associated with stateful objects, so that, with respect to the stateful objects, when the user selects the browser-based navigation commands, the processor 505 displays the previously displayed page according to the current session data 515.

In an embodiment of the present invention, a displayed page may be bookmarked for future reference. The processor 505 may respond to a request for a bookmarked page according to the same procedure it follows when responding to a selection of a browser-based navigation command, e.g., according to saved context values for non-stateful objects, and according to the current session data 515 for stateful objects.

Those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A method for generating a single frame display with a plurality of frameless data regions, comprising:
   presenting, on a display device, a first unitary page formed with a plurality of frameless data regions in a single frame display;
   storing a copy of single session data before an update of the single session data, the stored copy of the single session data including an identification of a page configuration of a displayed page and context data related to the state of the single session data with respect to the first unitary page;
   in response to a page request in one of the plurality of frameless data regions received via an input device:
   based on the stored single session data including the identification of the page configuration, selecting a first page configuration from a plurality of page configurations, each of the page configurations defining a respective arrangement of a plurality of frameless data regions assigned to a specific one of a plurality of different computer applications for contemporaneous presentation of data related to each of the plurality of different computer applications in the single frame display and an instruction to be performed by a processor;
   for each of the plurality of data regions assigned to the specific one of a plurality of computer applications arranged in accordance with the selected page configuration, placing a call to the specific application to extract source data therefrom;
   subsequent to the configuration selection, performing a second configuration selection based on instructions defined by the first page configuration;
   generating, by a session manager executing on a processor, a second unitary page formed with the plurality of data regions assigned to the specific one of a plurality of computer applications with the extracted source data according to the selected page configurations and the stored single session data; and
   presenting the second unitary page in place of the first unitary page in the single display frame.

2. The method of claim 1, wherein a user interaction with a displayed data region is treated as the page request.

3. The method of claim 1, wherein the first page configuration includes a reference to:
   a first at least one page configuration selectable during the second configuration selection; and
   when more than one page configuration is referenced, for each of the at least one page configuration, a corresponding condition for selection of the more than one page configuration during the second configuration selection is included in the selected page configuration.

4. The method of claim 3, wherein satisfaction of the corresponding conditions is determined based on the single session data.

5. The method of claim 4, further comprising:
   in response to a user interaction with a particular one of the data regions, updating the single session data to reflect the interaction with the particular data region,
   wherein configuration selections performed in response to the user interaction with the particular data region are performed subsequent to the update of the single session data.

6. The method of claim 5, further comprising:
   generating a page based on the stored identification and the stored copy of the single session data in response to an instruction to navigate from a first display generated in accordance with the configuration selections performed in response to the user interaction with the particular data region to a second display generated in accordance with the page configuration identified by the stored identification.

7. The method of claim 3, wherein the at least one page configuration includes the first page configuration.

8. The method of claim 1,
wherein the first page configuration includes a reference to:
a second page configuration and a first condition for the first page configuration selection; and
a data source and a second condition for data retrieval from the data source; and
wherein the second configuration selection is performed only upon satisfaction of the first condition.

9. The method of claim 8, wherein:
each page configuration includes a particular one of a plurality of layout definitions, a data region definition set defined by the particular layout definition, and for each data region definition of the data region definition set, a particular one of a plurality of corresponding components; and
each component includes at least one of:
a reference to at least one data source;
a reference to at least one layout definition;
a reference to at least one component for at least one data region; and
for one or more of the references, a corresponding condition for its implementation.

10. The method of claim 1, wherein the generated page includes the extracted source data laid out according to a data region definitions set forth in the selected page configuration.

11. A computer-readable storage medium having stored thereon instructions adapted to be executed by a processor, the instructions which, when executed, cause the processor to perform the method of claim 1.

12. A computer network, comprising:
a server having a plurality of applications executed thereon; and
a client terminal to interact with the plurality of applications executing on the server;
wherein the server further comprising a processor for executing:
a session manager storing data representing page configurations that each define a respective arrangement of a plurality of data regions assigned to a specific one of the plurality of computer applications for contemporaneous presentation in a display frame and an instruction to be performed by a processor, the session manager is configured to:
responsive to a page request based on a user interaction with a displayed data region on the client terminal for the specific one of the plurality of computer applications received from the client terminal selecting a first page configuration from one of the page configurations based on a single set of session data;
for each data region assigned to the specific one of the plurality of computer applications arranged in accordance with the selected first page configuration, extract data from a respective application of the plurality of computer applications, the session manager is further configured to:
determine whether a corresponding condition is satisfied based on the single set of session data;
subsequent to the first page configuration selection, select a second page configuration based on instructions, defined by the selected first page configuration;
store a copy of the session data before an update of the single set of session data;
store an identification of a page configuration of a displayed page so that the stored identification is associated with the stored copy of the single set of session data;
in response to a user interaction with a particular one of the data regions presented on the client terminal, update the single set of session data to reflect the interaction with the particular data region by the session manager, wherein the configuration selections performed in response to the user interaction with the particular data region are performed subsequent to the update of the single set of session data;
in response to an instruction to navigate from a first display generated in accordance with the configuration selections performed in response to the user interaction with the particular data region to a second display generated in accordance with the page configuration identified by the stored identification;
determine based on the session data whether a corresponding condition in the first page configuration, if present, is satisfied; and
generating a unitary page formed with the plurality of data regions having the extracted data for presentation on the client terminal according to the selected page configurations based on the stored identification and the stored copy of the session data, wherein the first page configuration includes a reference to the first page configuration selectable during a second configuration selection, and when more than the first page configuration is referenced, for each of the more than first page configurations referenced, the first page configuration includes a reference to a corresponding condition for selection of the more than first page configuration during the second configuration selection.

13. The computer network of claim 12, wherein:
each page configuration includes a particular one of a plurality of layout definitions, a data region definition set defined by the particular layout definition, and for each data region of the data region definition set, a particular one of a plurality of corresponding components; and
each component includes at least one of:
a reference to at least one data source;
a reference to at least one layout definition;
a reference to at least one component for at least one data region; and
for one or more of the references, a corresponding condition for its implementation.

14. The computer network of claim 12, wherein the generated page includes the extracted data laid out according to the data region definitions set forth in the selected page configuration.

15. A method for generating a frameless display, comprising:
interacting, via an input from an input device, with a data region of a plurality of frameless data regions displayed on a display device, wherein the interaction is treated by a processor as a page request, and data related to the interaction is stored in session data that includes an identification of particular applications with which the user has interacted during a session;
in response to the page request received from the input device:

based on information regarding a layout of a currently displayed page stored in the session data, selecting, by a processor, one of a plurality of page configurations as a first selected page configuration, each of the page configurations defining a respective arrangement of the data regions related to different computer applications;

for each data region related to the different computer applications arranged in accordance with the first selected page configuration, placing, by the processor, a call to the one respective different computer application to extract source data therefrom;

subsequent to the selection of the first selected page configuration, a second configuration selection is performed based on instructions defined by the first selected page configuration to select a second page configuration; and generating, by the processor, a unitary page formed with the plurality of data regions related to the different computer applications with the extracted source data according to the first and second selected page configurations, wherein the first page configuration includes a reference to:

a first at least one page configuration selectable during the second configuration selection, and when more than one page configuration is referenced, for each of the at least one page configuration, a corresponding condition for selection of the more than one page configuration during the second configuration selection is included in the first page configuration.

\* \* \* \* \*